United States Patent
Stewart

(10) Patent No.: US 10,773,352 B2
(45) Date of Patent: Sep. 15, 2020

(54) SYSTEM AND METHOD FOR DETERMINING EFFICIENCY OF AN INDUSTRIAL MACHINE

(71) Applicant: Joy Global Underground Mining LLC, Warrendale, PA (US)

(72) Inventor: Christopher Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 202 days.

(21) Appl. No.: 16/000,330

(22) Filed: Jun. 5, 2018

(65) Prior Publication Data

US 2018/0345436 A1  Dec. 6, 2018

Related U.S. Application Data

(60) Provisional application No. 62/515,123, filed on Jun. 5, 2017.

(51) Int. Cl.
*B23Q 17/09* (2006.01)
*G01N 3/58* (2006.01)
(Continued)

(52) U.S. Cl.
CPC ............ *B23Q 17/0966* (2013.01); *E21B 3/00* (2013.01); *E21C 27/24* (2013.01); *E21D 9/1006* (2013.01);
(Continued)

(58) Field of Classification Search
CPC ....... B23Q 17/0966; E21C 1/00; E21C 25/10; E21C 27/24; E21C 31/02; E21C 35/18; E21D 9/1006; G01N 3/58
See application file for complete search history.

(56) References Cited

U.S. PATENT DOCUMENTS 3,694,837 A  9/1972 Edwin et al.
3,841,149 A  10/1974 Edwin et al.
(Continued)

FOREIGN PATENT DOCUMENTS

CN  1643220 A  7/2005
CN  201013374 Y  1/2008
(Continued)

OTHER PUBLICATIONS

Office Action from the German Patent and Trademark Office for Application No. 102016205908.4 dated Sep. 5, 2016 (4 pages).
(Continued)

*Primary Examiner* — Francis C Gray
(74) *Attorney, Agent, or Firm* — Michael Best & Friedrich LLP

(57) ABSTRACT

An industrial machine including an actuator, a gear reducer, a cutter drum, a cutter bit, a sensor, and a controller. The gear reducer is configured to receive a first rotational energy from the actuator and output a second rotational energy. The cutter drum is supported by a chassis. The cutter drum is driven by the second rotational energy. The cutter bit is coupled to the cutter drum. The sensor is configured to sense a characteristic of the industrial machine. The controller, having a processor and memory, is configured to receive the characteristic of the industrial machine, determine a cutting efficiency based on the characteristic of the industrial machine, and output the cutting efficiency.

24 Claims, 6 Drawing Sheets

(51) Int. Cl.
  *E21C 27/24*   (2006.01)
  *E21D 9/10*    (2006.01)
  *E21B 3/00*    (2006.01)
  *E21C 31/02*       (2006.01)
  *E21C 25/10*       (2006.01)

(52) U.S. Cl.
  CPC ............... *G01N 3/58* (2013.01); *E21C 25/10* (2013.01); *E21C 31/02* (2013.01)

(56) References Cited

U.S. PATENT DOCUMENTS

| | | | |
|---|---|---|---|
| 4,251,872 | A | 2/1981 | Bone |
| 4,765,894 | A | 11/1988 | Davis, Jr. et al. |
| 5,335,977 | A | 8/1994 | Morrell et al. |
| 5,349,337 | A | 9/1994 | McCormick |
| 5,438,860 | A | 8/1995 | Kawai et al. |
| 5,848,859 | A * | 12/1998 | Clark ................ B23B 39/14 408/1 R |
| 5,938,288 | A | 8/1999 | Saint-Pierre et al. |
| 6,612,655 | B2 | 9/2003 | Schwoebel et al. |
| 6,857,706 | B2 | 2/2005 | Hames et al. |
| 7,887,142 | B2 | 2/2011 | Hall et al. |
| 8,386,196 | B2 | 2/2013 | Wagner et al. |
| 8,738,304 | B2 | 5/2014 | Hall et al. |
| 8,820,845 | B2 | 9/2014 | Hall |
| 9,920,624 | B2 | 3/2018 | Doheny, II et al. |
| 10,029,366 | B2 * | 7/2018 | Nakajima ............ B25J 9/1633 |
| 10,228,669 | B2 * | 3/2019 | Dunkin ............ B23Q 17/0966 |
| 2005/0168048 | A1 | 8/2005 | Gaertner et al. |
| 2010/0139987 | A1 | 6/2010 | Hunt et al. |
| 2010/0147084 | A1 | 6/2010 | Keskiniva et al. |
| 2011/0290560 | A1 | 12/2011 | Buske et al. |
| 2013/0082510 | A1 * | 4/2013 | O'Neill ............ E21C 41/00 299/42 |
| 2014/0077578 | A1 * | 3/2014 | Smith ............ E21C 25/16 299/1.4 |
| 2015/0019087 | A1 | 1/2015 | Knuth et al. |
| 2015/0032433 | A1 | 1/2015 | Li et al. |
| 2016/0061031 | A1 | 3/2016 | Ley et al. |
| 2016/0298452 | A1 * | 10/2016 | Doheny, II ............ E21C 25/10 |

FOREIGN PATENT DOCUMENTS

| | | |
|---|---|---|
| CN | 202348288 U | 7/2012 |
| CN | 103032066 A | 4/2013 |
| CN | 203321516 U | 12/2013 |
| DE | 2919499 C2 | 6/1983 |
| DE | 3505408 | 8/1986 |
| DE | 3616170 | 3/1987 |
| DE | 4415824 | 11/1995 |
| DE | 102005016346 | 1/2007 |
| FR | 2815999 | 5/2002 |
| JP | H06102029 | 4/1994 |
| JP | H0941863 | 2/1997 |
| JP | 2015124468 A | 7/2015 |
| SU | 1372041 A1 | 2/1988 |
| SU | 1439235 A1 | 11/1988 |
| SU | 1779278 A3 | 11/1992 |
| UZ | 2743 | 6/2005 |
| WO | 2014066981 | 5/2014 |
| WO | 2015126923 A1 | 8/2015 |

OTHER PUBLICATIONS

Combined Search Report and Examination Report from the United Kingdom Intellectual Property Office for Application No. GB1606028.7 dated Sep. 19, 2016 (5 pages).

David B. Board, Swantech LLC "Stress Wave Analysis Provides Early Detection of Lubrication Problems" https://www.machinerylubrication.com/Read/501/stress-wave-analysis webpage available at least as early as Jun. 4, 2018.

Partial Search Report issued from the European Patent Office for related Application No. 18146044.8 dated Oct. 22, 2018 (14 Pages).

Office Action issued from the Chinese Patent Office for related Application No. 201610220469.5 dated Dec. 28, 2018 (8 pages including Statement of Relevance).

Search Report issued from the European Patent Office for related Application No. 18176044.8 dated Jan. 28, 2019 (11 pages).

Russian Federal Service for Intellectual Property Office Action and Search Report for Related Application No. 2016113362/03 dated Aug. 7, 2019 (13 pages including English translation).

European Patent Office Action for Application No. 18248166.3-1002 dated Mar. 28, 2019 (9 pages).

* cited by examiner

SYSTEM AND METHOD FOR DETERMINING EFFICIENCY OF AN INDUSTRIAL MACHINE

RELATED APPLICATIONS

The present application claims priority to U.S. Provisional Application No. 62/515,123, filed Jun. 5, 2017, the entire contents of which are hereby incorporated by reference.

FIELD

Embodiments relate to industrial machines.

SUMMARY

Industrial machines, such as underground mining machines, may use a plurality of cutter bits attached to a rotating cutter drum in order to mine (for example, cut) material. During mining of the material it may be beneficial to determine a cutting efficiency of the plurality of cutter bits. The cutting efficiency may then be used to determine if one or more of the cutter bits are dull or worn.

Thus, one embodiment provides an industrial machine including an actuator, a gear reducer, a cutter drum, a cutter bit, a sensor, and a controller. The gear reducer is configured to receive a first rotational energy from the actuator and output a second rotational energy. The cutter drum is supported by a chassis. The cutter drum is driven by the second rotational energy. The cutter bit is coupled to the cutter drum. The sensor is configured to sense a characteristic of the industrial machine. The controller, having a processor and memory, is configured to receive the characteristic of the industrial machine, determine a cutting efficiency based on the characteristic of the industrial machine, and output the cutting efficiency.

Another embodiment provides an industrial machine including an actuator, a gear reducer, a cutter drum, a cutter bit, a sensor, and a controller. The gear reducer is configured to receive a first rotational energy from the actuator and output a second rotational energy. The cutter drum is supported by a chassis. The cutter drum is driven by the second rotational energy. The cutter bit is coupled to the cutter drum. The sensor is configured to sense a characteristic of the industrial machine. The controller, having a processor and memory, is configured to receive the characteristic of the industrial machine, determine the cutter bit is worn based on the characteristic of the industrial machine, and output a signal when the cutter bit is determined to be worn.

Another embodiment provides a method of determining cutting efficiency of an industrial machine. The method includes sensing, via a sensor, a characteristic of at least one selected from the group consisting of a gear reducer and a cutter drum and analyzing, via a controller, the characteristic. The method further includes determining, based on the characteristic, a cutting efficiency of the industrial machine, and outputting the cutting efficiency.

Yet another embodiment provides a method of determining if a cutter bit of an industrial machine is worn. The method includes sensing, via a sensor, a characteristic of at least one selected from the group consisting of a gear reducer and a cutter drum, and analyzing, via a controller, the characteristic. The method further includes determining, based on the characteristic, if the cutter bit is worn, and outputting a signal when the cutter bit is determined to be worn.

Yet another embodiment provides a method of determining if a cutter bit of a industrial machine is worn. The method including sensing, via a sensor, a first characteristics of at least one selected from the group consisting of a gear reducer and a cutter drum at a first time. The method further includes sensing, via a sensor, a second characteristics of the at least one selected from the group consisting of a gear reducer and a cutter drum at a second time. The method further includes comparing, via a controller, the first characteristic and the second characteristic, determining, based on the comparison, if a cutter bit is worn, and outputting a signal when the cutter bit is determined to be worn.

Yet another embodiment provides an industrial machine including an actuator, a gear reducer, a cutter drum, a cutter bit, a sensor, and a controller. The gear reducer is configured to receive a first rotational energy from the actuator and output a second rotational energy. The cutter drum is supported by a chassis. The cutter drum is driven by the second rotational energy. The cutter bit is coupled to the cutter drum. The sensor is configured to sense a first characteristic of the industrial machine at a first time and a second characteristic at a second time. The controller, having a processor and memory, is configured to receive the first and second characteristics, compare the first and second characteristics, determine, based on the comparison, if a cutter bit is worn, and output a signal when the cutter bit is determined to be worn.

Other aspects of the application will become apparent by consideration of the detailed description and accompanying drawings.

DETAILED DESCRIPTION

Before any embodiments are explained in detail, it is to be understood that the application is not limited in its application to the details of the configuration and arrangement of components set forth in the following description or illustrated in the accompanying drawings. The application is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the application may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the application. For example, "servers" and "computing devices" described in the specification can include one or more processing units, one or more computer-readable medium modules, one or more input/output interfaces, and various connections (e.g., a system bus) connecting the components.

Figure 1:
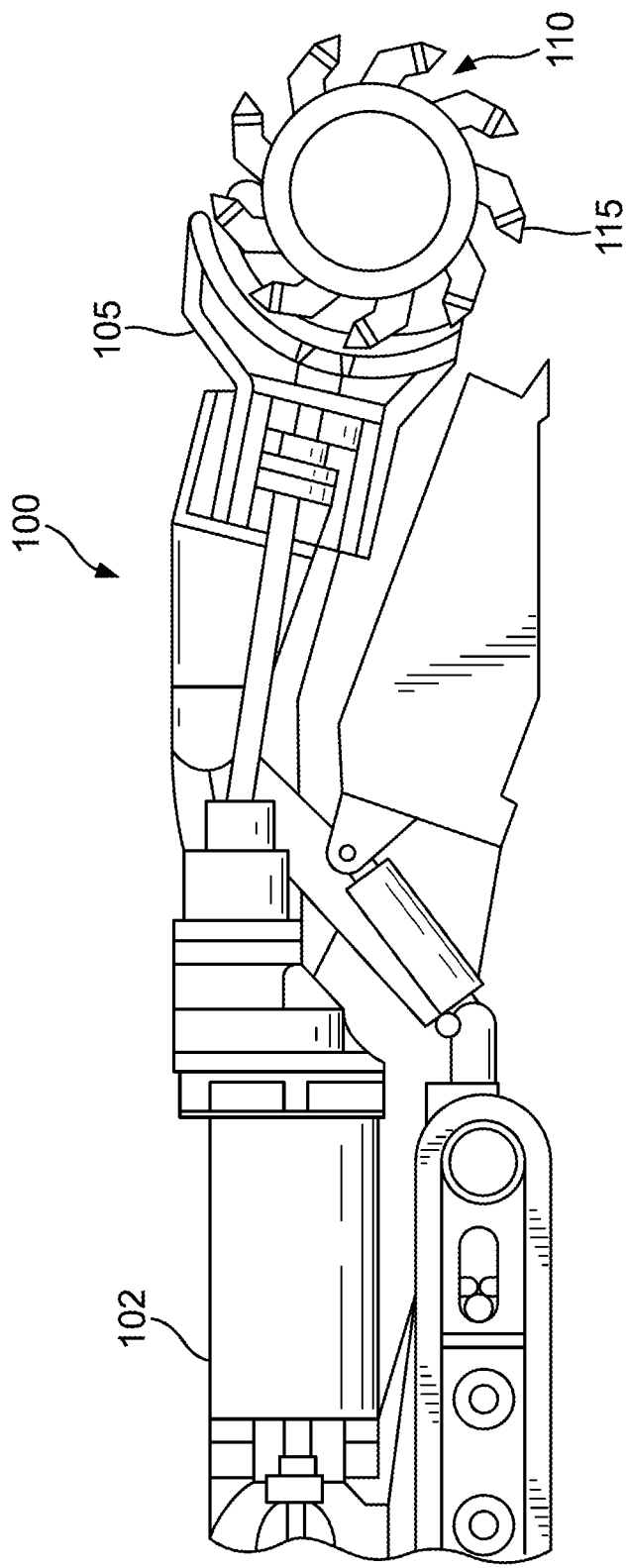
FIG. 1 illustrates a perspective view of an industrial machine according to some embodiments.

FIG. 1 illustrates an industrial machine 100, such as a continuous miner, according to some embodiments. Although illustrated as a continuous miner, in other embodiments (not shown), the industrial machine 100 may be another type of industrial machine, including but not limited to, a long wall shearer, a rock crusher, or another type of mining machine. Additionally, the application is not limited to mining machines and may be used in conjunction with a variety of apparatuses, or industrial machines, having oscillating discs or drill bits.

The industrial machine 100 includes a frame, or chassis, 102 supporting a cutter system 105, which includes a rotating drum 110 with one or more cutter bits 115 for cutting material (e.g., coal, salt, or another mined material) from a surface to be mined. The cutter system 105 is rotationally driven by one or more actuators 225 (FIG. 3) via a gear box, or gear reducer 235 (FIG. 3), which mechanically connects the one or more actuators 225 to the rotating drum 110. That is, the gear box 235 (FIG. 3) receives output from the one or more actuators 225 and, in turn, drives the drum 110. The cutter bits 115 are replaceably coupled to the drum 110.

Figure 2:
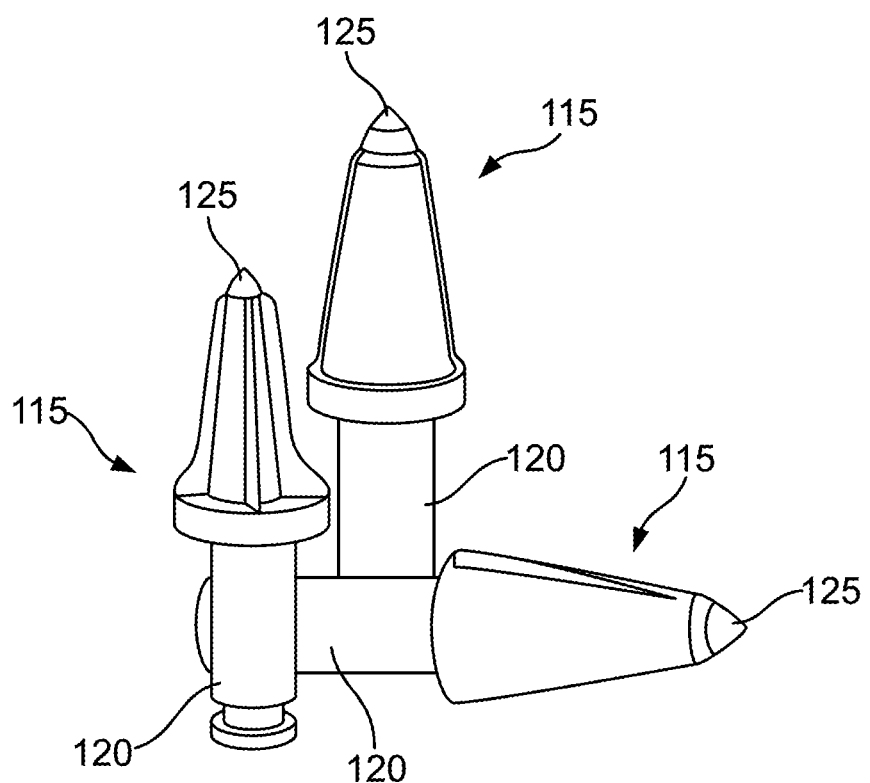
FIG. 2 illustrates a perspective view of individual cutter bits of the industrial machine of FIG. 1 according to some embodiments.

FIG. 2 illustrates individual cutter bits 115 according to some embodiments. Each cutter bit 115 includes a base 120 and a pick, or bit, 125. The base 120 releasably couples the cutter bit 115 to the drum 110. The pick 125 engages material (i.e., the pick 125 is forced through the in situ seam to extract the material). At any given time, multiple picks 125 may be engaged with the material.

Figure 3:
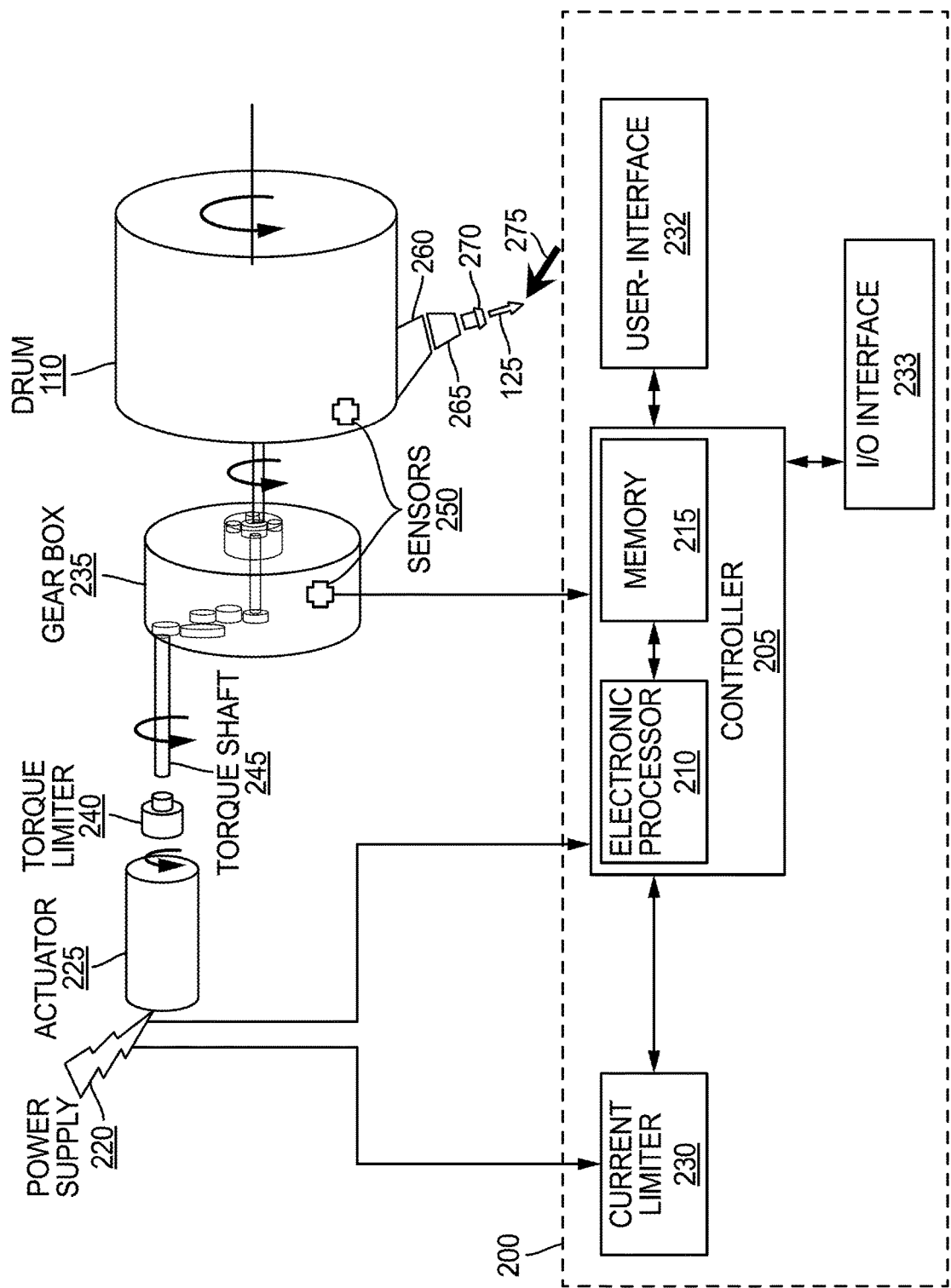
FIG. 3 illustrates a block diagram of the industrial machine of FIG. 1 according to some embodiments.

FIG. 3 illustrates a block diagram of the industrial machine 100 according to some embodiments. In the illustrated embodiment, the industrial machine 100 further includes a control system 200. The control system 200 includes, among other things, a controller 205 having combinations of hardware and software that are operable to, among other things, control the operation of the industrial machine 100 and operation of the control system 200. For example, the controller 205 includes a processor 210 and memory 215. The controller 205 is electrically and/or communicatively connected to a variety of modules or components of the industrial machine 100, such as but not limited to, a power supply 220, an actuator 225, a current limiter 230, and a variety of sensors (for example, sensors 250).

In some embodiments, the control system 200 may further include a user-interface 232 and/or an input/output (I/O) interface 233. The user-interface 232 may be used to control or monitor the industrial machine 100 and includes a combination of digital and analog input or output devices used to achieve a desired level of control and/or monitoring of the industrial machine 100. The I/O interface 233 may be configured to input and output data from the control system 200 to outside device(s), for example, through a network. The network may be, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.). In other embodiments, the network is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the I/O interface 233 may be configured to communicate with an external device via radio-frequency identification (RFID).

In some embodiments, the controller 205 includes a plurality of electrical and electronic components that provide power, operational control, and protection to the components and modules within the controller 205 and/or industrial machine 100. For example, the controller 205 includes, among other things, the processor 210 (e.g., a microprocessor, a microcontroller, or another suitable programmable device) and the memory 215. The processor 210 and the memory 215, as well as the various modules connected to the controller 205 are connected by one or more control and/or data buses. In some embodiments, the controller 205 is implemented partially or entirely on a semiconductor (e.g., a field-programmable gate array ["FPGA"] semiconductor) chip, such as a chip developed through a register transfer level ("RTL") design process.

The memory 215 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 210 is connected to the memory 215 and executes software instructions that are capable of being stored in a RAM of the memory 215 (e.g., during execution), a ROM of the memory 215 (e.g., on a generally permanent basis), or another non-transitory computer readable medium such as another memory or a disc. Software included in the implementation of the industrial machine 100 can be stored in the memory 215 of the controller 205. The software includes, for example, firmware, one or more applications, program data, filters, rules, one or more program modules, and other executable instructions. The controller 205 is configured to retrieve from memory 215 and execute, among other things, instructions related to the control processes and methods described herein. In other constructions, the controller 205 includes additional, fewer, or different components.

Power supply 220 supplies power to the industrial machine 100. In some embodiments, the power supply 220 supplies power having approximately 900 volts alternating-current (VAC) to approximately 4200 VAC (for example, approximately 1000 VAC, approximately 2300 VAC, approximately 3300 VAC, approximately 4160 VAC, etc.). In some embodiments, the power supplied by the power supply 220 may be rectified to a direct-current (DC) and/or be reduced to a nominal voltage. In such an embodiment, the nominal voltage may be used to power components and/or modules within the industrial machine 100 (for example, controller 205).

As discussed above, the industrial machine 100 further includes one or more actuators 225. Actuator 225 receives power from power supply 220 and outputs energy. In some embodiments, the energy output from actuator 225 is rotational energy. In other embodiments, the energy output from actuator 225 may be later converted to rotational energy. The energy from actuator 225 may be used to drive the cutter system 105 via the gear box 235. The actuator 225 may be any actuator that applies a force (e.g., a rotational force, a linear force, etc.). In one embodiment, the actuator 225 is a motor, such as but not limited to, an alternating-current (AC) motor (e.g., a synchronous motor, an AC induction motor, etc.), a direct-current motor (e.g., a commutator direct-current motor, a permanent-magnet direct-current motor, a wound field direct-current motor, etc.), and a switched reluctance motor or other type of reluctance motor. In another embodiment, the actuator 225 is a hydraulic motor, such as but not limited to, a linear hydraulic motor (i.e., hydraulic cylinders) or a radial piston hydraulic motor. In some embodiments, the industrial machine 100 includes a plurality of actuators 225 for operating various aspects of the industrial machine 100. In such an embodiment, the actuators 225 may be a combination of AC motors, DC motors, and hydraulic motors. For example, but not limited to, an AC motor or DC motor may rotationally drive the cutter system 105 while a hydraulic motor reacts to cutting loads and positions the cutter system 105 as necessary.

Current limiter 230 monitors current received by actuator 225 from power supply 220. Current limiter 230 may further set a current limit (or receive a user-input current limit) for the current received by actuator 225. In one embodiment of operation, when the current received by the actuator 225 crosses the current limit, current limiter 230 shuts down the actuator 225. In some embodiments, the current limiter 230 shuts down the actuator 225 by sending a signal to the controller 205, which in turn shuts down the actuator 225. In some embodiments, the current limiter 230 includes a temperature sensor (for example, one or more resistive temperature diodes (RTD)). In such an embodiment, the current limiter 230 may monitor a temperature of the actuator 225. In such an embodiment, the monitored temperature may correspond to a current received by actuator 225. In one embodiment of operation, when the temperature of the actuator 225 crosses a temperature threshold, the current limiter 230 shuts down the actuator 225.

In the illustrated embodiment, the industrial machine 100 further includes a torque limiter 240. The torque limiter 240 may limit a torque of the rotational energy supplied from the actuator 225 to the gear box 235. In some embodiments, the torque limiter 240 acts similar to a clutch, such that once the torque reaches a torque limit, frictional drive forces of the torque limiter 240 will begin to slip relative to each other. This slippage isolates rotor inertia away from the gear box 235, thus providing protection from excess torque.

In the illustrated embodiment, energy from actuator 225 is transferred to gear box 235 via a torque shaft 245. In some embodiments, the torque shaft 245 further protects the gear box 235 from excess torque. For example, if the torque placed on the gear box 235 exceeds a predetermined torque level, the torque shaft 245 is configured to fail, thus halting the transfer of energy from the actuator 225 to the gear box 235. In such an embodiment, the torque shaft 245 may be replaceable. In some embodiments, the torque exceeding a predetermined torque level may be a result of drum 110 coming into contact with a substantially immovable object.

Gear box 235 receives the energy at a first rotational speed at a first torque, converts the energy to a second rotational speed at a second torque, and outputs the energy at the second rotational speed and at the second torque to the drum 110. In some embodiment, the first rotational speed is greater than the second rotational speed while the first torque is less than the second torque.

As stated above, controller 205 may further be communicatively and/or electrically connected to one or more sensors 250. The one or more sensors 250 may be configured to sense one or more characteristics of one or more components (for example, but not limited to, the gear box 235 and/or the drum 110) of the industrial machine 100. For example, in some embodiments, the one or more sensors 250 may be configured to sense stress wave energy (SWE). In some embodiments, the SWE may be analyzed to determine a friction (for example, a friction over time) of one or more components of the industrial machine 100. Additionally, in some embodiments, the SWE may be analyzed to determine stress (for example, stress over time) of one or more components of the industrial machine 100. For example, SWE analysis may provide measurements of friction and mechanical shock of one or more components of the industrial machine 100. In some embodiments, sensors 250 may include one or more ultrasonic sensors (for example, piezoelectric transducers). In some embodiments, sensors 250 may alternatively, or in addition to the ultrasonic sensors, include one or more speed sensors (for example, one or more rotational speed sensors), one or more temperature sensors, one or more accelerometers, and/or one or more vibration sensors.

In the illustrated embodiment, the picks 125 are coupled to the drum 110 via pedestal 260, a block 265, and a sleeve 270. In other embodiments, the picks 125 may be coupled to the drum 110 in a different manner (for example, directly coupled to the drum 110).

As the drum 110 rotates in response to receiving the energy at the second rotational speed and second torque, individual picks 125 are forced into engagement with the mine face in order to extract the material to be mined. A force (illustrated as arrow 275) is applied to the individual picks 125 in order to maintain engagement with the material and maintain movement through the material. At any given time, multiple picks 125 may be engaged with the material.

In one exemplary operation, as the drum 110 rotates, sensors 250 sense net cutting forces (for example, level and variations of a net of force 275 on each pick 125) and/or torque (for example, level and variations of torque applied to gear box 235 and/or torque applied to drum 110). In some embodiments, the net cutting forces may be determined via sensor 250 (for example, sensing SWE), voltage, and/or current sensing of actuator 225 and/or pressure sensing of a hydraulic system (for example, one or more hydraulic motors used to position cutter system 105). In such an embodiment, a model-based estimator may invert one or more system dynamics to enable the quantification of the cutting loads from the sensed characteristics (for example, SW, voltage, current, and/or pressure measurements). In some embodiments, the torque may be determined via voltage and/or current sensing of actuator 225.

The net cutting forces, the torque, and a production rate of the industrial machine 100 (for example, an amount of material mined by the industrial machine 100 during a predetermined time period) may be monitored over time in order to determine, among other things, a cutting efficiency of the industrial machine 100 and/or if one or more cutter picks 125 are dull or worn. In some embodiments, a cutting efficiency of the industrial machine 100 corresponds to an amount of energy (for example, specific energy) used by the industrial machine 100 compared to a production rate of the industrial machine 100. In some embodiments, the amount of energy may be based on characteristics (for example, power, voltage, current, etc.) of the one or more actuators 225. In some embodiments, cutting efficiency may relate to a size of the material mined by the industrial machine 100. For example, a high cutting efficiency may result in mined material that is too fine; a low cutting efficiency may result in a mined material that is to course; while a cutting efficiency within a predetermined range may result in a mined material having a desired size to produce the best results.

Herein, the terms "dull" or "worn" may be defined as a predetermined amount of wear on a bit 115 and/or a pick 125. For example, but not limited to, dull or worn may be defined as a predetermined distance of deterioration on a pick 125 of a bit 115. As another example, but not limited to, dull or worn may be defined as a predetermined percentage of deterioration on a pick 125 of a bit 115.

Figure 4:
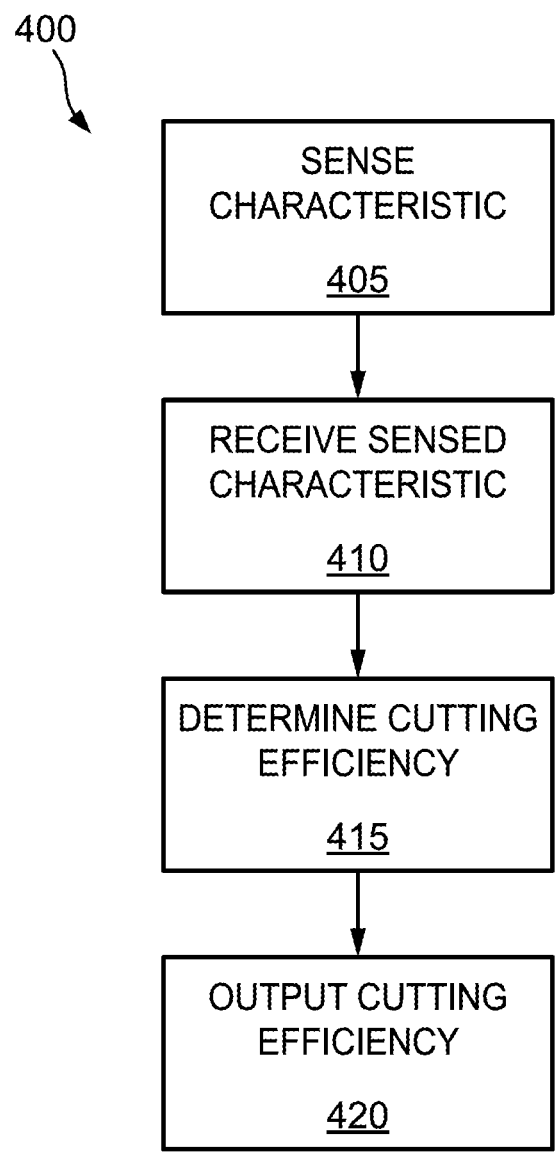
FIG. 4 is a flow chart illustrating an operation of the industrial machine of FIG. 1 according to some embodiments.

FIG. 4 is a flow chart illustrating a process 400 of the industrial machine 100 according to some embodiments. It should be understood that the order of the steps disclosed in process 400 could vary. Furthermore, additional steps may be added to the sequence and not all of the steps may be required. At block 405, the one or more sensors 250 sense one or more characteristics (for example, SWE, speed, vibration, acceleration, temperature, voltage, current, and/or pressure) of one or more components (for example, gear box 235, drum 110, etc.). The controller 205 receives the one or more sensed characteristics (block 410). The controller 205 determines a cutting efficiency based on the one or more characteristics of the industrial machine 100 (block 415). In some embodiments, the SWE of a component (for example, gear box 235, drum 110, etc.) may correlate to the cutting efficiency of the industrial machine 100. For example, a low SWE of the component may correlate to a relatively high cutting efficiency, while a high SWE of the component may correlate to a relatively low cutting efficiency. In some embodiments, the cutting efficiency is determined based on the SWE of a component by first: (1) sensing and/or monitoring the SWE of the component over a time period; (2) monitoring a cutting efficiency over the same period; and (3) comparing the monitored SWE to the monitored cutting efficiency. Such a comparison may be used to determine a SWE/cutting efficiency empirical database benchmark. In some embodiments, the SWE/cutting efficiency empirical database benchmark corresponds to the industrial machine 100 operating under normal conditions. In some embodiments, while determining the SWE/cutting efficiency empirical database, background noise levels may be monitored, rated, and measured. Once the SWE/cutting efficiency empirical database is determined, SWE of the component may then be sensed/monitored (for example, in one embodiment of block 410) and compared to the SWE/cutting efficiency empirical database benchmark to determine a cutting efficiency based on the sensed SWE (for example, in one embodiment of block 415). Additionally, in such an embodiment, determining the cutting efficiency based on the sensed SWE may include removing any background noise (for example, by using the previously monitored, rated, and measured background noise as a benchmark).

The controller 205 outputs the cutting efficiency (block 420). In some embodiments, the cutting efficiency is output to a user via user-interface 232. In other embodiments, the cutting efficiency is output, via the I/O interface 233 and a network, to an external device (for example, an external computer, a smartphone, a tablet, a server (for example, a cloud-based server, etc.).

Figure 5:
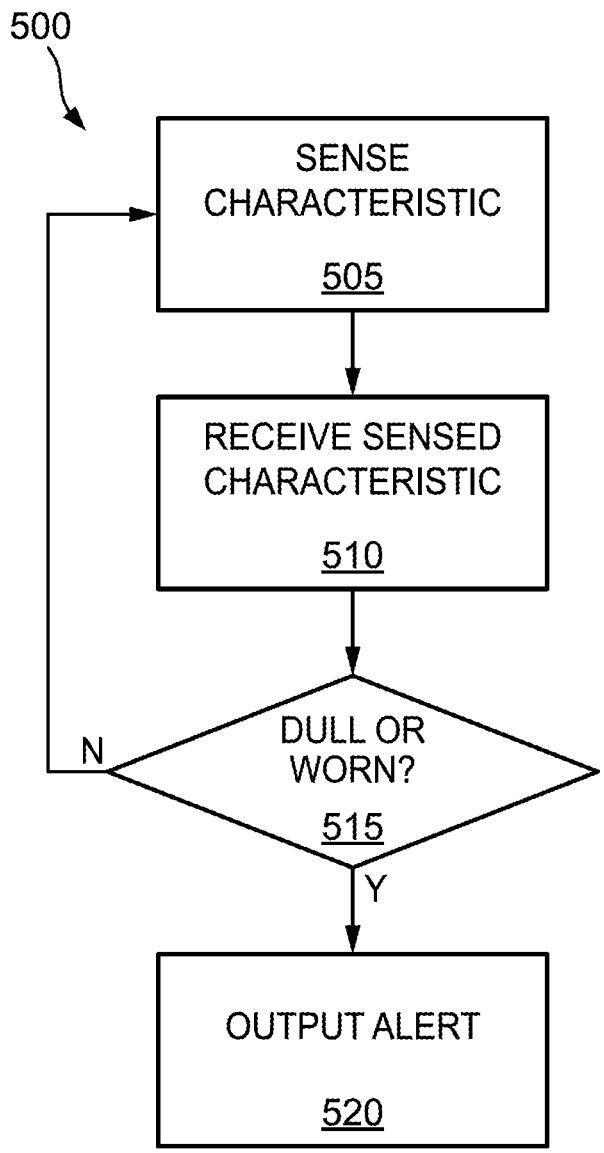
FIG. 5 is a flow chart illustrating an operation of the industrial machine of FIG. 1 according to some embodiments.

FIG. 5 is a flow chart illustrating a process 500 of the industrial machine 100 according to some embodiments. It should be understood that the order of the steps disclosed in process 500 could vary. Furthermore, additional steps may be added to the sequence and not all of the steps may be required. At block 505, the one or more sensors 250 sense one or more characteristics (for example, SWE, speed, vibration, acceleration, temperature, voltage, current, and/or pressure) of one or more components (for example, gear box 235, drum 110, etc.). The controller 205 receives the one or more sensed characteristics (block 510). The controller 205 determines if one or more cutter picks 125 are dull or worn based on the one or more sensed characteristic of the industrial machine (block 515). In some embodiments, the controller 205 determines if one or more cutter picks 125 are dull or worn based on a comparison of the sensed one or more sensed characteristics to a threshold. In some embodiments, the SWE of a component (for example, gear box 235, drum 110, etc.) may correlate to a dull or worn cutter pick 125 of the industrial machine 100. For example, a low SWE of the component may correlate to an unworn cutter pick 125, while a high SWE of the component may correlate to a dull or worn cutter pick 125.

In some embodiments, the SWE is monitored over a predetermined time period to determine a SWE empirical database. In some embodiments, while determining the SWE empirical database, background noise levels may be monitored, rated, and measured. Once the SWE empirical database is determined, SWE of the component may then be sensed/monitored (for example, in one embodiment of block 510) and compared to the SWE empirical database benchmark (for example, an SWE empirical database determined during normal operating conditions of the industrial machine 100) to determine any variations between a sensed SWE and the SWE empirical database. Additionally, in such an embodiment, determining the variations may include removing any background noise (for example, by using the previously monitored, rated, and measured background noise as a benchmark). In such embodiments, variations between the sensed SWE and the SWE empirical database may be indicative of a dull or worn cutter pick 125. With respect to process 500, if no cutter picks 125 are dull or worn, process 500 cycles back to block 505.

If one or more cutter picks 125 are dull or worn, the controller 205 outputs an alert (block 520). In some embodiments, the alert may output to the user-interface 232. In another embodiment, the alert may be output, via the I/O interface 233 and a network, to an external device (for example, an external computer, a smartphone, a tablet, a server (for example, a cloud-based server, etc.).

Figure 6:
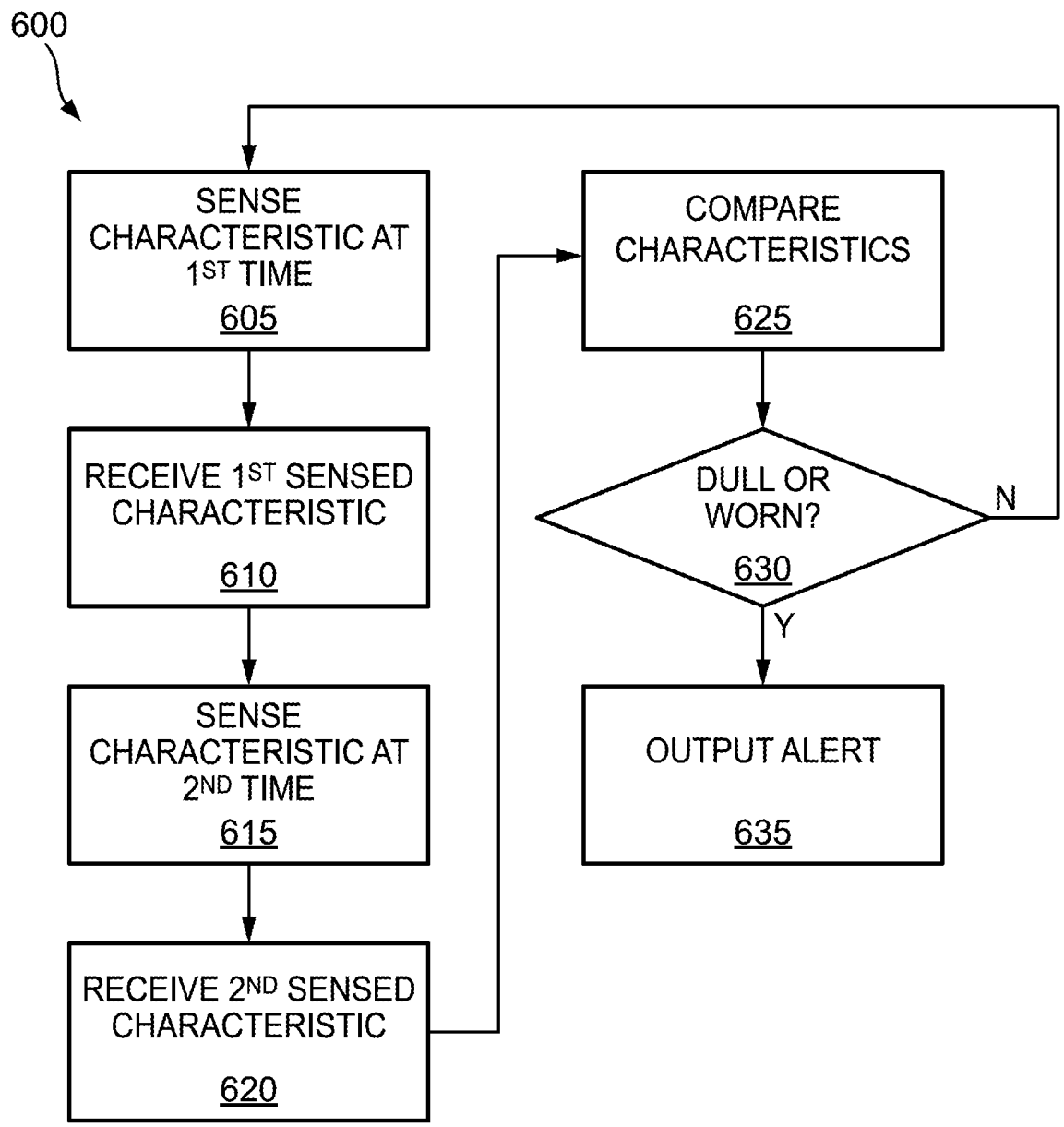
FIG. 6 is a flow chart illustrating an operation of the industrial machine of FIG. 1 according to some embodiments.

FIG. 6 is a flow chart illustrating a process 600 of the industrial machine 100 according to some embodiments. It should be understood that the order of the steps disclosed in process 600 could vary. Furthermore, additional steps may be added to the sequence and not all of the steps may be required. At block 605, the one or more sensors 250 sense one or more characteristics (for example, SWE, speed, vibration, acceleration, temperature, voltage, current, and/or pressure) at a first time. The controller 205 receives the one or more sensed characteristics (block 610). The one or more sensors 250 sense the one or more characteristics at a second time (block 615) and the controller receives the one or more sensed characteristics at the second time (block 620). The controller 205 compares the characteristic at the first and second times (block 625) and determines if one or more cutter picks 125 are dull or worn based on the comparison (block 630). If no cutter picks 125 are dull or worn, process 600 cycles back to block 605.

If one or more cutter picks 125 are dull or worn, the controller 205 outputs an alert is one or more cutter picks 125 are dull or worn (block 635). In some embodiments, the alert may output to the user-interface 232. In another embodiment, the alert may be output, via the I/O interface 233 and a network, to an external device (for example, an external computer, a smartphone, a tablet, a server (for example, a cloud-based server, etc.).

Thus, various embodiments of a system and method are provided for determining cutting efficiency of an industrial machine and if one or more cutter bits of the industrial machine are dull or worn. Various features and advantages of the application are set forth in the following claims.

What is claimed is:

1. An industrial machine comprising:
an actuator;
a gear reducer configured to receive a first rotational energy from the actuator and output a second rotational energy;
a cutter drum supported by a chassis of the industrial machine, the cutter drum driven by the second rotational energy;
a cutter bit coupled to the cutter drum;
a sensor configured to sense a characteristic of the industrial machine, wherein the characteristic is stress wave energy; and
a controller, having a processor and memory, the controller configured to
receive the characteristic of the industrial machine,
determine a cutting efficiency based on the characteristic of the industrial machine, and
output the cutting efficiency.

2. The industrial machine of claim 1, wherein the sensor is an ultrasonic sensor.

3. The industrial machine of claim 1, wherein the sensor is at least one selected from the group consisting of a speed sensor, a temperature sensor, an accelerometer, and a vibration sensor.

4. The industrial machine of claim 1, wherein the characteristic of the industrial machine is a characteristic of the gear reducer.

5. The industrial machine of claim 1, wherein the characteristic of the industrial machine is a characteristic of the cutter drum.

6. An industrial machine comprising:
an actuator;
a gear reducer configured to receive a first rotational energy from the actuator and output a second rotational energy;
a cutter drum supported by the chassis, the cutter drum driven by the second rotational energy;
a cutter bit coupled to the cutter drum;
a sensor configured to sense a characteristic of the industrial machine, wherein the characteristic is stress wave energy; and
a controller, having a processor and memory, the controller configured to
receive the characteristic of the industrial machine,
determine the cutter bit is worn based on the characteristic of the industrial machine, and
output a signal when the cutter bit is determined to be worn.

7. The industrial machine of claim 6, wherein the sensor is an ultrasonic sensor.

8. The industrial machine of claim 6, wherein the sensor is at least one selected from the group consisting of a speed sensor, a temperature sensor, an accelerometer, and a vibration sensor.

9. The industrial machine of claim 6, wherein the characteristic of the industrial machine is a characteristic of the gear reducer.

10. The industrial machine of claim 6, wherein the characteristic of the industrial machine is a characteristic of the cutter drum.

11. A method of determining a cutting efficiency of an industrial machine, the method comprising:
sensing, via a sensor, a characteristic of at least one selected from the group consisting of a gear reducer and a cutter drum, and wherein the characteristic is stress wave energy;
analyzing, via a controller, the characteristic;
determining, based on the characteristic, a cutting efficiency of the industrial machine; and
outputting the cutting efficiency.

12. The method of claim 11, wherein the sensor is an ultrasonic sensor.

13. A method of determining if a cutter bit of an industrial machine is worn, the method comprising:
sensing, via a sensor, a characteristics of at least one selected from the group consisting of a gear reducer and a cutter drum, and wherein the characteristic is stress wave energy;
analyzing, via a controller, the characteristic;
determining, based on the characteristic, if the cutter bit is worn; and
outputting a signal when the cutter bit is determined to be worn.

14. The method of claim 13, wherein the sensor is an ultrasonic sensor.

15. A method of determining if a cutter bit of an industrial machine is worn, the method comprising:
sensing, via a sensor, a first characteristic of at least one selected from the group consisting of a gear reducer and a cutter drum at a first time, wherein the first characteristic is stress wave energy;
sensing, via a sensor, a second characteristic of the at least one selected from the group consisting of a gear reducer and a cutter drum at a second time, wherein the second characteristic is stress wave energy;
comparing, via a controller, the first characteristic and the second characteristic;
determining, based on the comparison, if a cutter bit is worn; and
outputting a signal when the cutter bit is determined to be worn.

16. The method of claim 15, wherein the sensor is an ultrasonic sensor.

17. An industrial machine comprising:
an actuator;
a gear reducer configured to receive a first rotational energy from the actuator and output a second rotational energy;
a cutter drum supported by the chassis, the cutter drum driven by the second rotational energy;
a cutter bit coupled to the cutter drum;
a sensor configured to sense a first characteristic of the industrial machine at a first time and a second characteristic at a second time, wherein the first characteristic and the second characteristic are stress wave energy; and
a controller, having a processor and memory, the controller configured to
receive the first and second characteristics,
compare the first and second characteristics,
determine, based on the comparison, if a cutter bit is worn, and
output a signal when the cutter bit is determined to be worn.

18. The industrial machine of claim 6, wherein the sensor is an ultrasonic sensor.

19. The method of claim 11, wherein the sensor is at least one selected from the group consisting of a speed sensor, a temperature sensor, an accelerometer, and a vibration sensor.

20. The method of claim 13, wherein the sensor is at least one selected from the group consisting of a speed sensor, a temperature sensor, an accelerometer, and a vibration sensor.

21. An industrial machine comprising:
an actuator;
a gear reducer configured to receive a first rotational energy from the actuator and output a second rotational energy;
a cutter drum supported by a chassis of the industrial machine, the cutter drum driven by the second rotational energy;
a cutter bit coupled to the cutter drum;
a sensor configured to sense a characteristic of the industrial machine, wherein the sensor is at least one selected from the group consisting of an ultrasonic sensor, a speed sensor, a temperature sensor, an accelerometer, and a vibration sensor; and
a controller, having a processor and memory, the controller configured to
receive the characteristic of the industrial machine,
determine a cutting efficiency based on the characteristic of the industrial machine, and
output the cutting efficiency.

22. The industrial machine of claim 21, wherein the sensor is an ultrasonic sensor.

23. An industrial machine comprising:
an actuator;
a gear reducer configured to receive a first rotational energy from the actuator and output a second rotational energy;
a cutter drum supported by the chassis, the cutter drum driven by the second rotational energy;
a cutter bit coupled to the cutter drum;
a sensor configured to sense a characteristic of the industrial machine, wherein the sensor is at least one selected from the group consisting of an ultrasonic sensor, a speed sensor, a temperature sensor, an accelerometer, and a vibration sensor; and
a controller, having a processor and memory, the controller configured to
receive the characteristic of the industrial machine,
determine the cutter bit is worn based on the characteristic of the industrial machine, and
output a signal when the cutter bit is determined to be worn.

24. The industrial machine of claim 23, wherein the sensor is an ultrasonic sensor.

* * * * *